United States Patent
Boss et al.

(10) Patent No.: US 10,021,029 B2
(45) Date of Patent: Jul. 10, 2018

(54) METHOD FOR ROUTING INCOMING COMMUNICATION

(71) Applicant: International Business Machines Corporation, Armonk, NY (US)

(72) Inventors: Gregory J. Boss, Saginaw, MI (US); Jeremy R. Fox, Georgetown, TX (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 15/151,657

(22) Filed: May 11, 2016

(65) Prior Publication Data
US 2017/0331745 A1   Nov. 16, 2017

(51) Int. Cl.
*H04L 12/801* (2013.01)
*H04L 12/741* (2013.01)
(Continued)

(52) U.S. Cl.
CPC ............ *H04L 47/14* (2013.01); *H04L 45/745* (2013.01); *H04L 49/1584* (2013.01);
(Continued)

(58) Field of Classification Search
CPC ....... H04W 4/027; H04W 4/046; H04W 4/16; H04W 4/02; H04W 48/04; H04W 8/22; H04W 4/008; H04M 1/72577; H04M 1/72538; H04M 2250/10; H04M 1/6075; H04M 1/72569; H04M 2203/2094;
(Continued)

(56) References Cited

U.S. PATENT DOCUMENTS 5,644,629 A    7/1997   Chow
8,095,121 B2   1/2012   Link, II et al.
(Continued)

FOREIGN PATENT DOCUMENTS

EP    2192756 A1    6/2010

OTHER PUBLICATIONS

"Understanding the distracted brain", Why Driving While Using Hands-Free Cell Phones Is Risky Behavior, National Safety Council, White Paper Apr. 2012, © 2012 National Safety Council, 23 pages, <http://www.nsc.org/DistractedDrivingDocuments/Cognitive-Distraction-White-Paper.pdf>.

*Primary Examiner* — Erica Navar
(74) *Attorney, Agent, or Firm* — Brian M. Restauro (57) ABSTRACT

A first mobile device and a plurality of other mobile devices connect to a network. A routing configuration table is configured. The routing configuration table includes rules about sharing communication between the first mobile device and the plurality of other mobile devices. The first mobile device is paired with the plurality of other mobile device based on the routing configuration table. A determination is made whether the first mobile device has received a communication. In response to the determination that a communication has been received by the first mobile device, the communication is transferred to at least one mobile device of the plurality of mobile devices based on the configuration table.

17 Claims, 3 Drawing Sheets

(51) Int. Cl.
*H04L 12/933* (2013.01)
*H04W 12/06* (2009.01)
*H04W 4/00* (2018.01)
*H04W 84/12* (2009.01)
*H04W 4/08* (2009.01)
*H04W 4/80* (2018.01)

(52) U.S. Cl.
CPC .............. *H04W 12/06* (2013.01); *H04W 4/08* (2013.01); *H04W 4/80* (2018.02); *H04W 84/12* (2013.01)

(58) Field of Classification Search
CPC ...... H04M 3/436; H04M 1/6091; H04M 1/66; H04M 2203/2044; H04M 2242/14; H04M 2250/02; H04M 2250/06; H04M 3/42102; H04M 3/42348; H04M 3/46; H04M 3/54; H04M 3/541; H04M 5/543; H04K 2203/22; H04K 3/415; H04Q 2213/13091; H04Q 2213/13095; H04Q 2213/13103; H04Q 2213/1322; H04Q 2213/13256; H04Q 2213/13282

See application file for complete search history.

(56) References Cited

U.S. PATENT DOCUMENTS

| | | |
|---|---|---|
| 8,933,778 B2 | 1/2015 | Birkel et al. |
| 9,100,794 B2 | 8/2015 | Ewell, Jr. |
| 9,148,513 B2 | 9/2015 | Tadayon et al. |
| 9,185,526 B2 | 11/2015 | Guba et al. |
| 2006/0182248 A1* | 8/2006 | Smith ................ H04M 1/2745 379/201.01 |
| 2011/0111724 A1 | 5/2011 | Baptiste |
| 2011/0195699 A1* | 8/2011 | Tadayon ............. H04B 5/0062 455/418 |
| 2012/0244883 A1 | 9/2012 | Tibbitts et al. |
| 2013/0072172 A1 | 3/2013 | Chang et al. |
| 2015/0063554 A1 | 3/2015 | Hsiao et al. |
| 2015/0358471 A1 | 12/2015 | Roth et al. |

* cited by examiner

|  | MOBILE DEVICE OF USER: | | |
| --- | --- | --- | --- |
|  | "LINDA" | "TOM" | "MATT" |
| PAIRED WITH MOBILE DEVICE OF "MARK" | YES | YES | NO |
| COMMUNICATION TYPES ALLOWED VIA PAIRING: | - - - | - - - | - - - |
| PERSONAL CALLS | YES | NO | N/A |
| BUSINESS CALLS | NO | YES | N/A |
| PERSONAL E-MAILS | YES | NO | N/A |
| BUSINESS E-MAILS (NON-CONFIDENTIAL) | NO | YES | N/A |
| BUSINESS E-MAILS (CONFIDENTIAL) | NO | NO | N/A |
| PERSONAL TEXTS | YES | NO | N/A |
| BUSINESS TEXTS | NO | YES | N/A |
| PERSONAL SOCIAL MEDIA | YES | NO | N/A |
| BUSINESS SOCIAL MEDIA | YES | YES | N/A |

METHOD FOR ROUTING INCOMING COMMUNICATION

BACKGROUND

The present invention relates generally to the field of mobile device communication, and more particularly to routing (i.e., directing) incoming communications from a first mobile device to another mobile device.

Mobile devices of many types such as smartphones, smartwatches, phablets, tablets, wearable technology, and the like, are prominent today. These mobile devices also provide users with an easy way to communicate with other users. Methods of communication include phone calls, texting via short message service and/or multimedia messaging service, video calling, and the use of social media websites. Notifications to a user of these methods of communication include an audible notification such as a ringtone for a phone call, other audible sounds such as a beep, chime, or buzz, visual notification such as a blinking light, and haptic notification such as vibration.

SUMMARY OF THE INVENTION

Embodiments of the present invention include a method, computer program product, and system for transferring an incoming communication from a mobile device to another mobile device. In one embodiment, a first mobile device and a plurality of other mobile devices connect to a network. A routing configuration table is configured. The routing configuration table includes rules about sharing communication between the first mobile device and the plurality of other mobile devices. The first mobile device is paired with the plurality of other mobile device based on the routing configuration table. A determination is made whether the first mobile device has received a communication. In response to the determination that a communication has been received by the first mobile device, the communication is transferred to at least one mobile device of the plurality of mobile devices based on the configuration table.

DETAILED DESCRIPTION

Embodiments of the present invention provide for routing (i.e., directing) incoming communications from a first mobile device to another mobile device. Types of communication received by a mobile device include, but are not limited to, phone calls, text messages, social media website notifications, and the like. As an example, a person driving a vehicle should not be distracted by an incoming notification so that the likelihood of personal injury, injury to another person, and property damage may be reduced. However, driver distraction due to incoming communications is a problem, especially for younger drivers, based on the proliferation of mobile devices. Other examples where a user may want to route messages received by the mobile device of the user to a mobile device of another user include if the user is pre-occupied (e.g., giving a speech, playing a sport, at an appointment with a doctor, etc.) or if the user is pre-disposed (e.g., sleeping, ill, showering, etc.).

Embodiments of the present invention recognize that there may be a method, computer program product, and computer system for routing (i.e., directing) incoming communications from a first mobile device to another mobile device. The method, computer program product, and computer system may pair a first mobile device with a second mobile device so that communication received by the first mobile device may also be received by the second mobile device, based upon a routing configuration. The communications received by the second mobile device may be acted upon by the user of the second mobile device.

The present invention will now be described in detail with reference to the Figures.

Figure 1:
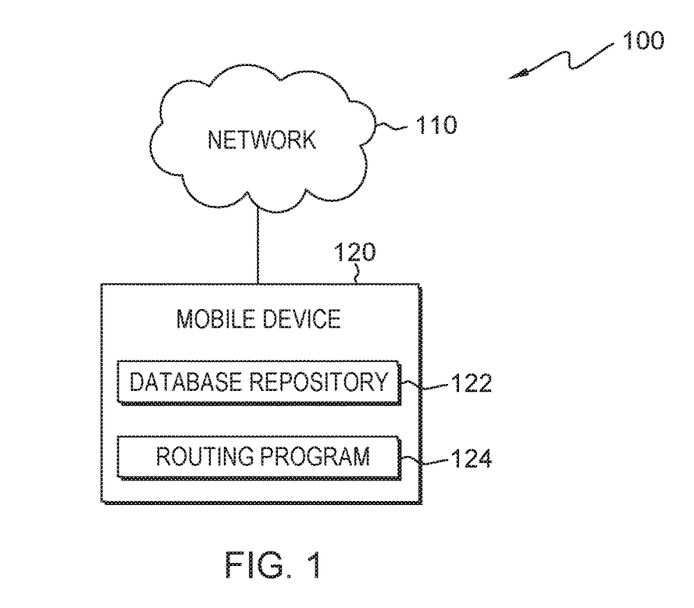
FIG. 1 depicts a functional block diagram of a data processing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes mobile device 120 connected to network 110. In example embodiments, computing environment 100 may include other computing devices (not shown) such as smartwatches, cell phones, smartphones, wearable technology, phablets, tablet computers, laptop computers, desktop computers, other computer servers or any other computer system known in the art, interconnected with mobile device 120 over network 110.

In example embodiments, mobile device 120 may connect to network 110, which enables mobile device 120 to access other computing devices and/or data not directly stored on mobile device 120. Network 110 may be, for example, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between mobile device 120 and any other computing device connected to network 110, in accordance with embodiments of the present invention. In an embodiment, data received by another computing device in computing environment 100 (not shown) may be communicated to mobile device 120 via network 110.

In an embodiment, mobile device 120 includes database repository 122 and routing program 124. In embodiments of the present invention, mobile device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, mobile device 120 represents a computer system utilizing clustered computers and components (e.g., database server computers, application server computers, etc.) that act as a single pool of seamless resources when accessed by elements of computing environment 100. In general, mobile device 120 is representative of any electronic device or combination of electronic devices capable of executing computer readable program instructions. Computing environment 100 may include any number of mobile device 120. Mobile device 120 may include components as depicted and described in further detail with respect to FIG. 4, in accordance with embodiments of the present invention.

According to embodiments of the present invention, database repository 122 may be storage that may be written to and/or read by mobile device 120. In one embodiment, database repository 122 resides on mobile device 120. In other embodiments, database repository 122 may reside on any other device (not shown) in computing environment 100, in cloud storage or on another computing device accessible via network 110. In yet another embodiment, database repository 122 may represent multiple storage devices within mobile device 120. In an embodiment, database repository 122 may be managed by routing program 124. In an alternative embodiment, database repository 122 may be managed by the operating system of mobile device 120, alone, or together with, routing program 124. Database repository 122 may be implemented using any volatile or non-volatile storage media for storing information, as known in the art. For example, database repository 122 may be implemented with a tape library, optical library, one or more independent hard disk drives, multiple hard disk drives in a redundant array of independent disks (RAID), solid-state drives (SSD), or random-access memory (RAM). Similarly, database repository 122 may be implemented with any suitable storage architecture known in the art, such as a relational database, an object-oriented database, or one or more tables. In an embodiment of the present invention, routing program 124 and any other applications (not shown) operating on mobile device 120 may store data to database repository 122.

An example of data stored to database repository 122 includes routing configuration data which defines the types of communications received by a first mobile device that may be routed to a paired (i.e., second) mobile device. In an embodiment, the first mobile device may be paired with one other mobile device. In another embodiment, the first mobile device may be paired with any number of other mobile devices. In an embodiment, routing configuration data stored to database repository 122 includes at least one of the following: which mobile devices of the plurality of mobile devices available are paired with the first mobile device (e.g., the first mobile device of "Mark" is paired with the mobile device of "Linda" and the mobile device of "Tom" but not with the mobile device of "Matt") and what types of communication may be routed from the mobile device of "Mark" to the other available mobile devices (e.g., personal calls received by the mobile device of "Mark" may be routed to the mobile device of "Linda" but not to the mobile device of "Tom"). Refer to table 300 in FIG. 3 for various routing configuration examples.

According to embodiments of the present invention, routing program 124 may be a program, subprogram of a larger program, application, plurality of applications, or mobile application software which functions to route (i.e., direct) incoming communications from a first mobile device to another mobile device. A program is a sequence of instructions written by a programmer to perform a specific task. Routing program 124 may run by itself but may be dependent on system software (not shown) to execute. In one embodiment, routing program 124 functions as a stand-alone program residing on mobile device 120. In another embodiment, routing program 124 may be included as a part of an operating system (not shown) of mobile device 120. In yet another embodiment routing program 124 may work in conjunction with other programs, applications, etc., found on mobile device 120 or in computing environment 100. In yet another embodiment, routing program 124 may be found on other computing devices (not shown) in computing environment 100 which are interconnected to mobile device 120 via network 110.

According to embodiments of the present invention, routing program 124 functions to route (i.e., direct) incoming communications from a first mobile device to one or more other mobile devices. According to an embodiment of the present invention, routing program 124 pairs mobile devices per a routing configuration table. Based on the rules found in the routing configuration table, routing program 124 routes communications received by the first mobile device to one or more other mobile devices.

In an embodiment, routing program 124 may include a user interface (not shown) that allows a user to interact with routing program 124. A user interface is a program that provides an interface between a user and routing program 124. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Figure 2:
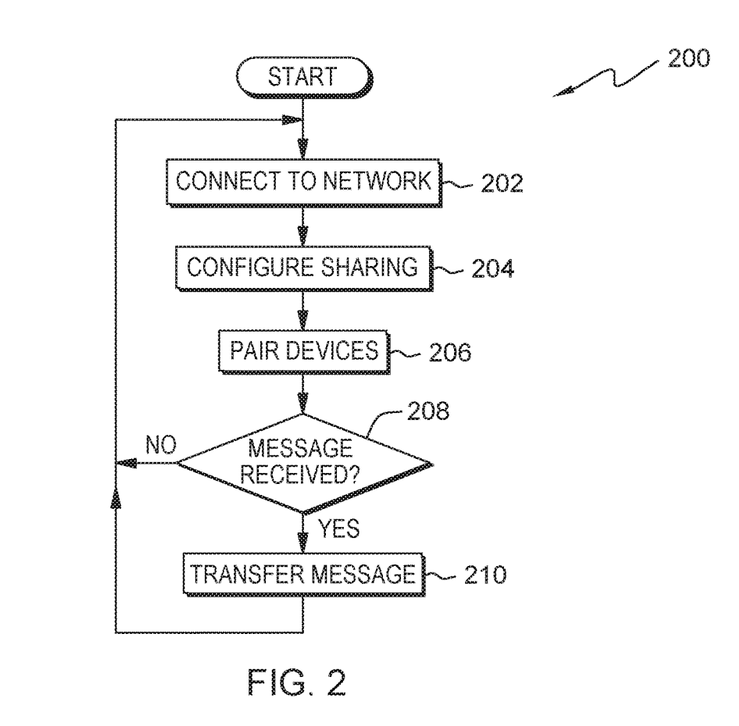
FIG. 2 depicts a flowchart of operational steps of a program for routing (i.e., directing) incoming communications from a first mobile device to another mobile device, in accordance with an embodiment of the present invention.

FIG. 2 is a flowchart of workflow 200 depicting operational steps for routing (i.e., directing) incoming communications from a first mobile device to one or more other mobile devices, in accordance with an embodiment of the present invention. In one embodiment, the steps of workflow 200 are performed by routing program 124. In an alternative embodiment, the steps of workflow 200 may be performed by any other program working with routing program 124. In an embodiment, a user, via a user interface discussed previously, may invoke workflow 200 upon a user initiating an action to define a routing configuration table within routing program 124. In an alternative embodiment, a user, via a user interface discussed previously, may invoke workflow 200 upon powering on entering a vehicle with the intent of driving the vehicle.

In an embodiment, routing program 124 connects to a network (step 202). In other words, routing program 124 connects the available mobile devices to a network so that the mobile devices may communicate with one another. In an embodiment, the mobile devices connect to a network automatically when the mobile devices are in close proximity to one another. In another embodiment, connecting to a network requires an authentication (e.g., a password, a personal identification number, a fingerprint, or any other authentication known in the art). In yet another embodiment, the mobile devices connect to a network when one of the mobile devices is placed in a device (e.g., a cradle) which activates the network. In an embodiment, the mobile devices may connect to a mesh network. A wireless mesh network (WMN) is a communications network made up of radio nodes organized in a mesh topology. It is also a form of wireless ad hoc network. Wireless mesh networks often consist of mesh clients, mesh routers and gateways. The mesh clients are often laptops, cell phones and other wireless devices while the mesh routers forward traffic to and from the gateways which may, but need not, be connected to the Internet. The coverage area of the radio nodes working as a single network is sometimes called a mesh cloud. Access to the mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can self-form and self-heal. Wireless mesh networks can be implemented with various wireless technologies including "802.11", "802.15", "802.16", and cellular technologies, and need not be restricted to any one technology or protocol. In another embodiment, a wireless local area network (WLAN), a wireless personal area network (WPAN), or any other wired or wireless network known in the art may be used to connect the plurality of mobile devices. In an embodiment, mobile device 120 is connected to network 110. For example, the mobile device of "Mark" is connected to a mesh network in a vehicle. In addition, the mobile devices of "Linda", "Tom", and "Matt", who are occupants in the vehicle with "Mark", are also connected to the mesh network in the vehicle.

In an embodiment, routing program 124 configures sharing (step 204). In other words, routing program 124 determines which communication types may be shared with (i.e., routed to) the other available mobile devices connected to the same network. In an embodiment, a user may configure the sharing for the mobile device of the user. For example, the user may decide to share messages received by the mobile device of the user with all other available mobile devices in the network, or with only one of three available mobile devices in the network, at the point in time when the other mobile devices become available. According to embodiments of the present invention, messages include phone calls, e-mails, texts, social media content, and the like. In another embodiment, routing program 124 may refer to a routing configuration table, stored to a database, to determine which available mobile devices may receive messages, as well as the type of messages that may be routed from the mobile device of the user. In yet another embodiment, routing program 124 may refer to an application with which a user, via a cloud service, adds "trusted friends" and the types of messages the "trusted friends" may receive routed from a mobile device of the user.

In an embodiment, routing program 124 refers to a routing configuration table stored to database repository 122 on mobile device 120 to configure sharing. For example, referring to table 300 in FIG. 3, the mobile device of "Linda" and the mobile device of "Tom" may receive certain messages routed from the mobile device of "Mark", as indicated by the yes or no notation in table 300, since both the mobile device of "Linda" and the mobile device of "Tom" are paired with the mobile device of "Mark". However, the mobile device of "Matt" may not receive any messages routed from the mobile device of "Mark", as indicated by the not applicable or N/A notation in table 300, since the mobile device of "Matt" is not paired with the mobile device of "Mark". As detailed in table 300 in FIG. 3, the types of messages routed from the mobile device of "Mark" to other users is defined. For example, the mobile device of "Linda" may receive personal calls routed from the mobile device of "Mark" but the mobile device of "Tom" cannot. Note that the mobile device of "Tom" may receive business calls routed from the mobile device of "Mark" but the mobile device of "Linda" cannot. In this example, "Linda" may be the spouse of "Mark" and "Tom" may be a business colleague of "Mark". The mobile device of "Matt", who may be a child in this example, cannot receive any messages routed from the mobile device of "Mark". Other examples of the types of messages that may be routed from the mobile device of "Mark" to the mobile device of "Linda" and to the mobile device of "Tom" are also illustrated in table 300 in FIG. 3.

In an embodiment, routing program 124 pairs devices (step 206). In other words, routing program 124 establishes a connection between mobile devices, which enables communication between the mobile devices. An example of pairing is that of pairing a mobile device with a headset to allow for hands free cellular phone calls. In an embodiment, routing program 124 activates discovery mode on the plurality of available mobile devices. Discovery mode allows compatible devices to "see" one another. Discovery mode may not be initially enabled as a means of saving battery reserve in a mobile device. In another embodiment, each mobile device user may activate discovery mode on the mobile device of each user. In yet another embodiment, when a mobile device detects a network (e.g., mesh, WLAN, WPAN, etc.), each mobile device activates discovery mode. In an embodiment, once the mobile devices discover the other available mobile devices, the mobile devices pair. In an embodiment, a user may determine which devices are paired with the mobile device of the user. In another embodiment, a routing configuration table, stored in a database, governs the pairing of mobile devices. In an embodiment, the pairing of devices is automatic. In another embodiment, the paring of devices requires an authentication (e.g., a password, a personal identification number, a fingerprint, or any other authentication known in the art). In an embodiment, once one or more pairings are severed, all routed (i.e., transferred) message content is stored to the mobile device that originally received the message content and the routed message content is deleted from the paired mobile device(s). In an embodiment, routing program 124 refers to a routing configuration table stored to database repository 122 on mobile device 120 to determine with which available mobile devices to pair. For example, as shown in table 300 in FIG. 3, the mobile device of "Mark" is paired with the mobile device of "Linda" and with the mobile device of "Tom" but not with the mobile device of "Matt".

In an embodiment, routing program 124 determines whether a message is received (decision step 208). In other words, routing program 124 determines whether a mobile device in a network, which is set up to route messages to another mobile device in the network, receives a message. In an embodiment (decision step 208, NO branch), a message is not received by the user device; therefore, routing program 124 returns to step 202 to continue to prepare to route messages. In the embodiment (decision step 208, YES branch), a message is received by the user device; therefore, routing program 124 proceeds to step 210.

In an embodiment, routing program 124 transfers the message (step 210). In other words, responsive to determining that a mobile device, which is set up to route messages to another mobile device, has received a message (decision step 208, YES branch), routing program 124 transfers the received message to the paired mobile device. In an embodiment, the message is transferred or prevented from being transferred based on a routing configuration table determined by a user. In another embodiment, the message is transferred or prevented from being transferred based on a routing configuration table stored to a local database repository. In yet another embodiment, the message is transferred or prevented from being transferred based on a routing configuration table, stored in a cloud service, and created by a user with an application. In an embodiment, routing program 124 may differentiate personal calls, e-mails, and texts from business calls, e-mails, and texts received by a user based on a contact list or a phone book stored to the mobile device of the user. In another embodiment, routing program 124 may differentiate confidential from non-confidential business e-mails received by a user based on the contact list or the phone book. In yet another embodiment, routing program 124 may differentiate confidential from non-confidential business e-mails and may differentiate personal social media from business social media based on analysis of the e-mails and social media using methods including natural language processing (NLP), cognitive computing, object recognition, video content analytics, and any other method known in the art.

In an embodiment, NLP is a field of computer science, artificial intelligence, and computational linguistics concerned with the interactions between computers and human (natural) languages. As such, NLP is related to the area of human-computer interaction. Many challenges in NLP involve natural language understanding, that is, enabling computers to derive meaning from human or natural language input, and others involve natural language generation.

In an embodiment, cognitive computing involves self-learning systems that use data mining, pattern recognition and natural language processing to mimic the way the human brain works. The goal of cognitive computing is to create automated information technology (IT) systems that are capable of solving problems without requiring human assistance. Cognitive computing systems use machine learning algorithms. Cognitive computing systems continually acquire knowledge from the data fed into them by mining data for information. The cognitive computing systems refine the way they look for patterns and as well as the way they process data so they become capable of anticipating new problems and modeling possible solutions.

In an embodiment, object recognition, in the field of computer vision, describes the task of finding and identifying objects in an image or video sequence. Humans recognize a multitude of objects in images with little effort, despite the fact that the image of the objects may vary somewhat in different viewpoints, in many different sizes and scales, or even when the image of the objects are translated or rotated. Objects may even be recognized when the objects are partially obstructed from view. Methods used may be appearance-based or feature-based.

In an embodiment, video content analytics (VCA) is the capability of automatically analyzing video to detect and determine temporal and spatial events. VCA technical capability is used in a wide range of domains including entertainment, health-care, retail, automotive, transport, home automation, safety and security. VCA algorithms can be implemented as software on general purpose machines, or as hardware in specialized video processing units. Many different functionalities can be implemented in VCA. Video Motion Detection is one of the simpler forms where motion is detected with regard to a fixed background scene. More advanced functionalities include video tracking and egomotion estimation. Based on the internal representation that VCA generates in the machine, it is possible to build other functionalities, such as identification, behavior analysis or other forms of situation awareness. VCA relies on good input video, so it is often combined with video enhancement technologies such as video denoising, image stabilization, unsharp masking and super-resolution.

In an embodiment, routing program 124 transfers a message received by mobile device 120 based on the routing configuration table stored to database repository 122. Refer to table 300 in FIG. 3 for the following example. For a first example, routing program 124 determines that the mobile device of "Mark" is paired with the mobile device of "Linda" and the mobile device of "Tom" but not with the mobile device of "Matt". Routing program 124 also determines that personal calls, personal e-mails, personal texts, and personal social media may be routed from the mobile device of "Mark" to the mobile device of "Linda" but not to the mobile device of "Tom". In this first example, routing program 124 transfers a personal e-mail received by the mobile device of "Mark" to the mobile device of "Linda" who is the spouse of "Mark". The personal e-mail is not routed to any other user in the network.

Figure 3:
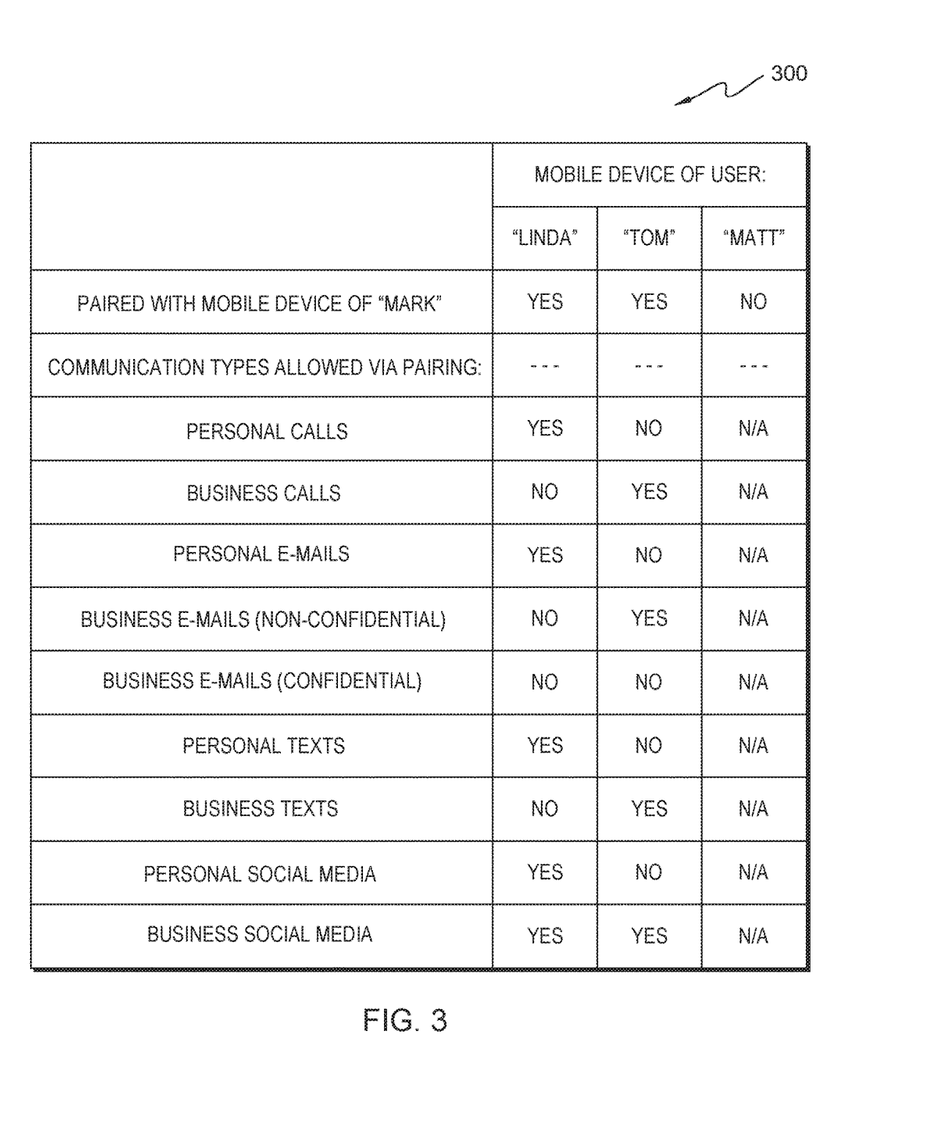
FIG. 3 is an example table of a routing configuration table for a user of a mobile device, in accordance with an embodiment of the present invention.

Again, refer to table 300 in FIG. 3 for the following example. In a second example, routing program 124 determines that the mobile device of "Mark" is paired with the mobile device of "Linda" and the mobile device of "Tom" but not with the mobile device of "Matt". Routing program 124 also determines that business calls, non-confidential business e-mails, and business texts may be routed from the mobile device of "Mark" to the mobile device of "Tom" but not to the mobile device of "Linda". Routing program 124 also determines that business social media may be routed from the mobile device of "Mark" to the mobile device of both "Linda" and "Tom". In this second example, routing program 124 transfers a non-confidential business e-mail, received by the mobile device of "Mark", to the mobile device of "Tom", who is a business colleague of "Mark". The non-confidential business e-mail is not routed to any other user in the network.

Again, refer to table 300 in FIG. 3 for the following example. In a third example, routing program 124 determines that the mobile device of "Mark" is paired with the mobile device of "Linda" and the mobile device of "Tom" but not with the mobile device of "Matt". Routing program 124 also determines that a confidential business e-mail, received by the mobile device of "Mark", cannot be routed to the mobile device of "Linda" or the mobile device of "Tom". In this third example, a confidential business e-mail received by the mobile device of "Mark" is not routed to either the mobile device of "Linda" or the mobile device of "Tom" as neither "Linda" (the spouse of "Mark") or "Tom" (the business colleague of "Mark") has the appropriate clearance to receive confidential information related to the business of "Mark".

Again, refer to table 300 in FIG. 3 for the following example. In a fourth example, routing program 124 determines that the mobile device of "Mark" is paired with the mobile device of "Linda" and the mobile device of "Tom" but not with the mobile device of "Matt". Routing program 124 also determines that business social media content received by the mobile device of "Mark" may be routed to the mobile device of "Linda" and the mobile device of "Tom". In this fourth example, business related social media content received by the mobile device of "Mark" is routed to both the mobile device of "Linda" and the mobile device of "Tom" as content posted to social media is non-confidential and available to the general public which includes both "Linda" and "Tom".

Figure 4:
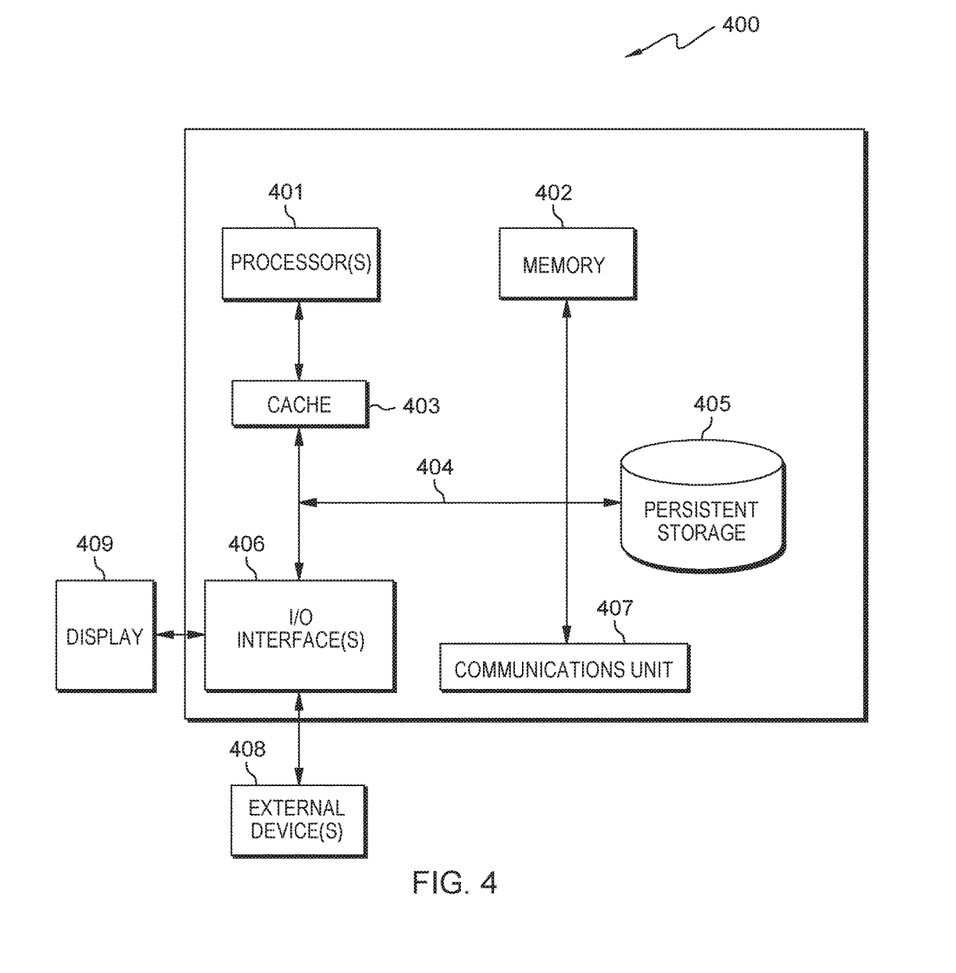
FIG. 4 depicts a block diagram of components of the mobile device of FIG. 1, in accordance with an embodiment of the present invention.

FIG. 4 depicts computer system 400, which is an example of a system that includes routing program 124. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for transferring an incoming communication from a mobile device to another mobile device, the method comprising the steps of:
    connecting, by one or more computer processors, a first mobile device and a plurality of other mobile devices to a network;
    configuring, by one or more computer processors, a routing configuration table, wherein the routing configuration table includes rules about sharing communications between the first mobile device and the plurality of other mobile devices;
    pairing, by one or more computer processors, the first mobile device and the plurality of other mobile devices based on the routing configuration table;
    determining, by one or more computer processors, whether a communication of a plurality of communications is received by the first mobile device;
    responsive to determining that the communication of the plurality of communications has been received by the first mobile device, transferring, by one or more computer processors, the communication of the plurality of communications to at least one mobile device of the plurality of other mobile devices based on the routing configuration table;
    determining, by one or more processors, whether a pairing between the first mobile device and one or more mobile devices of the plurality of mobile devices is severed;
    responsive to determining that the pairing between the first mobile device and one or more mobile devices of the plurality of mobile devices is severed, identifying, by one or more computer processors, the one or more mobile devices of the plurality of mobile devices associated with the severed pairing;
    identifying, by one or more computer processors, the transferred communication associated with the identified one or more mobile devices of the plurality of mobile devices associated with the severed pairing;
    storing, by one or more computer processors, the identified transferred communication to the first mobile device; and
    deleting, by one or more computer processors, the identified transferred communication from the one or more mobile devices of plurality of other mobile devices paired to the first mobile device.

2. The method of claim 1, wherein the step of connecting, by one or more computer processors, a first mobile device and a plurality of other mobile devices to a network, comprises:
    detecting, by one or more computer processors, the network, wherein the network is selected from the group consisting of a wireless mesh network, a wireless local area network, and a wireless personal area network; and
    connecting, by one or more computer processors, the first mobile device and the plurality of other mobile devices to the network, wherein the connection is an automatic connection or a connection requiring an authentication, and wherein the authentication is selected from the group consisting of a password, a personal identification number, or a fingerprint.

3. The method of claim 1, wherein the plurality of communications is selected from a group consisting of a personal phone call, a business phone call, a personal e-mail, a business e-mail, a personal text, a business text, a personal social media content, and a business social media content, and wherein the business e-mail may be confidential or non-confidential.

4. The method of claim 3, wherein a personal communication may be differentiated from a business communication based on an item selected from the group consisting of a phone book, a contact list, a natural language processing analysis, a cognitive computing analysis, an object recognition analysis, and a video content analysis, and wherein a confidential business e-mail may be differentiated from a non-confidential e-mail based on an item selected from the group consisting of a phone book, a contact list, a natural language processing analysis, a cognitive computing analysis, an object recognition analysis, and a video content analysis.

5. The method of claim 1, wherein the step of transferring, by one or more computer processors, the communication of the plurality of communications to at least one mobile device of the plurality of other mobile devices based on the routing configuration table, comprises:
identifying, by one or more computer processors, a type of communication the at least one mobile device of the plurality of mobile devices is allowed to receive; and
responsive to determining that the communication is the type of communication that is identified as allowed to be received, transferring, by one or more computer processors, the communication to the at least one mobile device.

6. The method of claim 5, further comprising:
responsive to determining that the communication is the type of communication that is not identified as allowed to be received, preventing, by one or more computer processors, the transfer of the communication from the first mobile device to the at least one mobile device.

7. A computer program product for transferring an incoming communication from a mobile device to another mobile device, the computer program product comprising:
one or more computer readable storage media; and
program instructions stored on the one or more computer readable storage media, the program instructions comprising:
program instructions to connect a first mobile device and a plurality of other mobile devices to a network;
program instructions to configure a routing configuration table, wherein the routing configuration table includes rules about sharing communications between the first mobile device and the plurality of other mobile devices;
program instructions to pair the first mobile device and the plurality of other mobile devices based on the routing configuration table;
program instructions to determine whether a communication of a plurality of communications is received by the first mobile device;
responsive to determining that the communication of the plurality of communications has been received by the first mobile device, program instructions to transfer the communication of the plurality of communications to at least one mobile device of the plurality of other mobile devices based on the routing configuration table;
program instructions to determine whether a pairing between the first mobile device and one or more mobile devices of the plurality of mobile devices is severed;
responsive to determining that the pairing between the first mobile device and one or more mobile devices of the plurality of mobile devices is severed, program instructions to identify the one or more mobile devices of the plurality of mobile devices associated with the severed pairing;
program instructions to identify the transferred communication associated with the identified one or more mobile devices of the plurality of mobile devices associated with the severed pairing;
program instructions to store the identified transferred communication to the first mobile device; and
program instructions to delete the identified transferred communication from the one or more mobile devices of plurality of other mobile devices paired to the first mobile device.

8. The computer program product of claim 7, wherein the program instructions to connect a first mobile device and a plurality of other mobile devices to a network, comprises:
program instructions to detect the network, wherein the network is selected from the group consisting of a wireless mesh network, a wireless local area network, and a wireless personal area network; and
program instructions to connect the first mobile device and the plurality of other mobile devices to the network, wherein the connection is an automatic connection or a connection requiring an authentication, and wherein the authentication is selected from the group consisting of a password, a personal identification number, or a fingerprint.

9. The computer program product of claim 7, wherein the plurality of communications is selected from a group consisting of a personal phone call, a business phone call, a personal e-mail, a business e-mail, a personal text, a business text, a personal social media content, and a business social media content, and wherein the business e-mail may be confidential or non-confidential.

10. The computer program product of claim 9, wherein a personal communication may be differentiated from a business communication based on an item selected from the group consisting of a phone book, a contact list, a natural language processing analysis, a cognitive computing analysis, an object recognition analysis, and a video content analysis, and wherein a confidential business e-mail may be differentiated from a non-confidential e-mail based on an item selected from the group consisting of a phone book, a contact list, a natural language processing analysis, a cognitive computing analysis, an object recognition analysis, and a video content analysis.

11. The computer program product of claim 7, wherein the program instructions to transfer the communication of the plurality of communications to at least one mobile device of the plurality of other mobile devices based on the routing configuration table, comprises:
program instructions to identify a type of communication the at least one mobile device of the plurality of mobile devices is allowed to receive; and
responsive to determining that the communication is the type of communication that is identified as allowed to be received, program instructions to transfer the communication to the at least one mobile device.

12. The computer program product of claim 11, further comprising program instructions stored on the one or more computer readable storage media, to:
responsive to determining that the communication is the type of communication that is not identified as allowed to be received, prevent the transfer of the communication from the first mobile device to the at least one mobile device.

13. A computer system for transferring an incoming communication from a mobile device to another mobile device, the computer system comprising:
one or more computer processors;
one or more computer readable storage media; and
program instructions stored on the one or more computer readable storage media for execution by at least one of the one or more computer processors, the program instructions comprising:
program instructions to connect a first mobile device and a plurality of other mobile devices to a network;
program instructions to configure a routing configuration table, wherein the routing configuration table includes rules about sharing communications between the first mobile device and the plurality of other mobile devices;
program instructions to pair the first mobile device and the plurality of other mobile devices based on the routing configuration table;
program instructions to determine whether a communication of a plurality of communications is received by the first mobile device;
responsive to determining that the communication of the plurality of communications has been received by the first mobile device, program instructions to transfer the communication of the plurality of communications to at least one mobile device of the plurality of other mobile devices based on the routing configuration table;
program instructions to determine whether a pairing between the first mobile device and one or more mobile devices of the plurality of mobile devices is severed;
responsive to determining that the pairing between the first mobile device and one or more mobile devices of the plurality of mobile devices is severed, program instructions to identify the one or more mobile devices of the plurality of mobile devices associated with the severed pairing;
program instructions to identify the transferred communication associated with the identified one or more mobile devices of the plurality of mobile devices associated with the severed pairing;
program instructions to store the identified transferred communication to the first mobile device; and
program instructions to delete the identified transferred communication from the one or more mobile devices of plurality of other mobile devices paired to the first mobile device.

14. The computer system of claim 13, wherein the program instructions to connect a first mobile device and a plurality of other mobile devices to a network, comprises:
program instructions to detect the network, wherein the network is selected from the group consisting of a wireless mesh network, a wireless local area network, and a wireless personal area network; and
program instructions to connect the first mobile device and the plurality of other mobile devices to the network, wherein the connection is an automatic connection or a connection requiring an authentication, and wherein the authentication is selected from the group consisting of a password, a personal identification number, or a fingerprint.

15. The computer system of claim 13, wherein the plurality of communications is selected from a group consisting of a personal phone call, a business phone call, a personal e-mail, a business e-mail, a personal text, a business text, a personal social media content, and a business social media content, and wherein the business e-mail may be confidential or non-confidential.

16. The computer system of claim 15, wherein a personal communication may be differentiated from a business communication based on an item selected from the group consisting of a phone book, a contact list, a natural language processing analysis, a cognitive computing analysis, an object recognition analysis, and a video content analysis, and wherein a confidential business e-mail may be differentiated from a non-confidential e-mail based on an item selected from the group consisting of a phone book, a contact list, a natural language processing analysis, a cognitive computing analysis, an object recognition analysis, and a video content analysis.

17. The computer system of claim 13, wherein the program instructions to transfer the communication of the plurality of communications to at least one mobile device of the plurality of other mobile devices based on the routing configuration table, comprises:
program instructions to identify a type of communication the at least one mobile device of the plurality of mobile devices is allowed to receive; and
responsive to determining that the communication is the type of communication that is identified as allowed to be received, program instructions to transfer the communication to the at least one mobile device.

* * * * *